US005540863A

United States Patent [19]

Wood et al.

[11] Patent Number: 5,540,863
[45] Date of Patent: *Jul. 30, 1996

[54] MIXTURES OF POLYAMINO ACIDS AND CITRATE

[75] Inventors: Louis L. Wood, Rockville; Gary J. Calton, Elkridge, both of Md.

[73] Assignee: Bayer AG, Leverkusen, Germany

[ * ] Notice: The term of this patent shall not extend beyond the expiration date of Pat. No. 5,389,303.

[21] Appl. No.: 366,669

[22] Filed: Dec. 30, 1994

Related U.S. Application Data

[63] Continuation of Ser. No. 118,588, Sep. 10, 1993, Pat. No. 5,389,303.

[51] Int. Cl.⁶ .............................. C11D 1/10; C11D 3/33; C11D 3/20
[52] U.S. Cl. ........................ 510/356; 510/528; 510/230
[58] Field of Search .................................. 252/544, 546, 252/174.23, 174.24, 174.19

[56] References Cited

U.S. PATENT DOCUMENTS

| | | | |
|---|---|---|---|
| 2,306,918 | 12/1942 | Weiss et al. | 260/78 |
| 3,052,655 | 9/1962 | Fox et al. | 260/78 |
| 3,474,083 | 10/1969 | Shiga et al. | 260/112.5 |
| 3,846,380 | 11/1974 | Fujimoto et al. | 260/78 A |
| 4,169,924 | 10/1979 | Barabas et al. | 525/377 |
| 4,363,797 | 12/1982 | Jacquet et al. | 424/70 |
| 4,407,722 | 10/1983 | Davies et al. | 252/91 |
| 4,514,185 | 4/1985 | Lee et al. | 8/137 |
| 4,534,833 | 8/1985 | Sikes et al. | 252/180 |
| 4,590,260 | 5/1986 | Harada et al. | 528/328 |
| 4,696,981 | 9/1987 | Harada et al. | 525/328.2 |
| 4,839,461 | 7/1989 | Boehmke | 528/363 |
| 4,996,292 | 2/1991 | Fox et al. | 528/328 |
| 5,057,597 | 10/1991 | Koskan | 528/328 |
| 5,116,513 | 5/1992 | Koskan et al. | 210/698 |
| 5,142,062 | 8/1992 | Knebel et al. | 548/545 |
| 5,152,902 | 10/1992 | Koskan et al. | 210/698 |
| 5,219,952 | 6/1993 | Koskan et al. | 525/419 |
| 5,221,733 | 6/1993 | Koskan et al. | 530/333 |
| 5,268,437 | 12/1993 | Holy et al. | 526/229 |
| 5,284,512 | 2/1994 | Koskan et al. | 106/416 |
| 5,286,810 | 2/1994 | Wood | 525/421 |
| 5,288,783 | 2/1994 | Wood | 525/418 |
| 5,292,864 | 3/1994 | Wood et al. | 528/490 |
| 5,319,145 | 6/1994 | Paik et al. | 528/328 |
| 5,328,631 | 7/1994 | Du Vosel et al. | 252/174.23 |
| 5,357,004 | 10/1994 | Calton et al. | 525/435 |
| 5,367,047 | 11/1994 | Wood | 528/363 |
| 5,391,642 | 2/1995 | Wood | 525/435 |
| 5,393,868 | 2/1995 | Freeman et al. | 528/480 |
| 5,408,028 | 4/1995 | Wood et al. | 528/328 |
| 5,466,760 | 11/1995 | Wood | 525/435 |

FOREIGN PATENT DOCUMENTS

| | | | |
|---|---|---|---|
| 256366 | 2/1988 | European Pat. Off. . | |
| 454126 | 10/1991 | European Pat. Off. | C11D 3/37 |
| 511037 | 10/1992 | European Pat. Off. | C11D 3/37 |
| 561464 | 9/1993 | European Pat. Off. . | |
| 561452 | 9/1993 | European Pat. Off. . | |
| 578448 | 1/1994 | European Pat. Off. . | |
| 578450 | 1/1994 | European Pat. Off. . | |
| 592265 | 4/1994 | European Pat. Off. . | |
| 593187 | 4/1994 | European Pat. Off. . | |
| 608160 | 7/1994 | European Pat. Off. . | |
| 1404814 | 9/1975 | United Kingdom . | |
| 2246786 | 2/1992 | United Kingdom . | |
| WO92/14753 | 9/1992 | WIPO . | |
| WO93/23452 | 11/1993 | WIPO . | |
| WO94/14939 | 7/1994 | WIPO . | |

OTHER PUBLICATIONS

Harada, Polycondensation of Thermal Precursors of Aspartic Acid, Journal of Org. Chem., vol. 24 pp. 1662–1666 Mar. 1959.

Chemical Abstracts, vol. 111, No. 6, 7 Aug. 1989, Columbus, Ohio, US; abstract No. 40111d, *Zusammenfassung* & JP-A-63 270 735 (KOEI Chemical) 8 Nov. 1988.

Dessaignes, Quarterly Journal of the Chemical Society of London, vol. III, reprinted 1950. Translation of Comp. Rend. XXX, 324. no month available.

Kovacs et al., *Chemical Studies of Polyaspartic Acids*, Journal of Organic Chemistry, vol. 26, pp. 1084–1091 Jul. 1960.

Sarig et al., *The Use of Polymers for Retardation of Scale Formation*, Natl. Counc. Res. Dev., [Rep.] NCRD (Isr.) pp. 150–157 (1977). no month available.

Dessaignes, Chimie Organique, *Nouvelles recherches sur la production de l'acide succinique au moyen de la fermentation*; C.R. 31. pp. 432–433, (1850) (The original French language version–translation at BC). no month available.

Chemical Abstracts, vol. 79, 55246w, 1973 no month available, Fujimoto et al., *Poly(amino acids) as surfactants in detergents and cosmetics*. GB A: 1404814 (May 10, 1973).

Chemical Abstracts, vol. 109, 57112m, 1988 no month available, Yaguchi et al., *Surfactant compositions with mildness towards skin*. DE 3,724,460 (Feb. 4, 1988).

*Primary Examiner*—Erin M. Harriman
*Attorney, Agent, or Firm*—Connolly & Hutz

[57] ABSTRACT

Polyamino acids or their salts mixed with citric acid or its salts, in a ratio of 75:25 to 0.1:99.9, polyamino acid or its salt to citric acid or its salts, and especially in a ratio of 1:1 to 1:99 polyamino acids or their salts to citric acid or its salts, provide a much higher rate of chelation of calcium ion than expected on the basis of the addition of the polyamino acid to citric acid. Such mixtures may be used in high volume water applications such as boiler, cooling, oil well, agricultural sprays and irrigation water. They are also useful in preventing scale formation on fabrics when formulated with laundry detergents and in preventing scale formation on glassware when formulated in dishwashing detergents.

26 Claims, No Drawings

MIXTURES OF POLYAMINO ACIDS AND CITRATE

CROSS-REFERENCE TO RELATED APPLICATION

This application is a continuation of U.S. patent application Ser. No. 08/118,588 filed on Sep. 10, 1993, in the names of Louis L. Wood and Gary J. Calton (now U.S. Pat. No. 5,389,303).

FIELD OF THE INVENTION

This invention relates to the use of mixtures polyamino acids and citric acid or their salts to provide a synergistically enhanced calcium chelating mixture.

DESCRIPTION OF RELATED ART

U.S. Pat. No. 3,474,083 discloses a method for making copolypeptides by heating to L-lysine and L-glutamic acid or L-aspartic acid in a oil bath at 80° to 160° C. in an aqueous medium for two to four hours.

U.S. Pat. No. 3,846,380 discloses the preparation and composition of copolymers of polyamino acids with primary or secondary aliphatic amines, followed by alkaline hydrolysis to provide surface active agents. Emphasis is placed on long chain alkylamines having eight to twenty carbon atoms. The products formed are said to have good solubilizing ability, emulsifying and dispersing properties, as well as good foaming properties. They are useful as foaming agents, solubilizing agents, dispersing agents, emulsifying agents, rust-proofing agents, fiber-treating agents, level dyeing agents and retarding agents.

U.S. Pat. No. 4,363,797 discloses the use of polyaspartic acid derivatives for use in cosmetic compositions.

Ger. Offen. DE 3,724,460 discloses the use of surfactant compositions with skin mildness which contain polyglutamic or polyaspartic acid and their salts.

U.S. Pat. No. 4,534,881 discloses the use of polyaspartate and polyaspartate copolymers to inhibit $CaCO_3$ formation.

U.S. Pat. No. 4,696,981 discloses a method for making polyamino acids with microwaves and a method of heating to make copolyamino acids in a oil bath at 180° for four hours to achieve maximum yields.

U.S. Pat. No. 4,839,461 discloses a method for making polyaspartic acid from maleic acid and ammonia which is useful in preventing scale on glassware in automatic dishwasher formulations.

U.S. Pat. No. 5,057,597 discloses a method for the polycondensation of aspartic acid to produce polyaspartic acid by heating the aspartic acid in a fluidized bed reactor to 221° C. for a period of 3–6 hours in a nitrogen atmosphere followed by conventional alkaline hydrolysis.

U.S. Pat. No. 5,116,513 discloses the use of polyaspartic acid as an inhibitor of calcium sulfate and barium sulfate precipitation.

U.S. Pat. No. 5,152,902 discloses the use of polyaspartic acid as an inhibitor of calcium carbonate and calcium phosphate precipitation.

European Patent Application 0 454 126 A1 discloses the use of polyamino acids as builders in detergent formulations.

European Patent Application 0 511 037 A1 discloses the use of polyimide biopolymer, especially those from aspartic and glutamic acids as dispersants in detergent formulations.

U.S. patent application Ser. No. 07/926,242, filed Aug. 7, 1992 now abandoned, by Louis L. Wood, incorporated herein by reference, discloses methods of preparation of copolymers of amino acids wherein polyamines are reacted with maleic acid and ammonia to form a polymer network. These materials are excellent inhibitors of metal scale deposition.

U.S. patent application Ser. No. 08/007,376 filed Jan. 21, 1993 now U.S. Pat. No. 5,288,783, by Louis L. Wood, incorporated herein by reference, discloses methods of preparation of polymers of amino acids wherein maleic acid and ammonia are reacted at high temperature to form a polymer network. These materials are excellent inhibitors of metal scale deposition.

SUMMARY OF THE INVENTION

We have discovered that polyamino acids having a charge density of $COO^-$ approximately equal to $10^{-3}$ mole/g of polymer, especially those based on the acidic amino acids, aspartic acid and glutamic acid, or copolymers of these acids such as those described in U.S. patent application Ser. No. 07/926,242, filed Aug. 7, 1992 now abandoned, by Louis L. Wood, incorporated herein by reference or those described in U.S. Pat. No. 3,846,380, incorporated herein by reference, or those described in U.S. patent application Ser. No. 07/994,922 filed Dec. 22, 1992 now U.S. Pat. No. 5,408,028, by Louis L. Wood, incorporated herein by reference, or their salts, when mixed with citric acid or its salts, provide a mixture that has properties of calcium chelation significantly beyond that of the additive effects of the two compounds and is extremely useful in a detergent composition.

Such compositions are especially valuable in softening water for detergent formulation and in prevention of scale formation where the calcium salts are problematic.

One object of this invention is to provide a composition useful in inhibition or reduction of calcium scale formation in hard water, boiler water, cooling water, oil well waters, agricultural sprays, irrigation water, and laundry waters through its incorporation in formulations for treatment of such conditions.

Another object is to provide a composition which inhibits or reduces the deposition of calcium salts in clothing during laundering when incorporated in a detergent.

Another object is to prevent or reduce deposition of scale on glassware washed in an automatic dishwasher by addition of the composition to a dishwashing detergent.

Yet another object is to prevent or reduce deposition of dental calculus on teeth or objects used in the oral cavity via incorporation in a suitable formulation.

A final object is to provide methods for preventing or reducing calcium scale formation which are effective, low in cost, and environmentally benign.

DEFINITIONS

Polyaspartate includes the L and the D,L stereoisomers in any of the ratios present as well as the $\alpha$ and $\beta$ amide bonds of the aspartate moiety.

All percentages and ratios are by weight.

The salts of polyamino acids and derivatives thereof include but are not limited to, the alkali and alkaline earth metals, examples of which as their cations are, $Na^+$, $K^-$, $Mg^+$, $Li^+$, and $Ca^{++}$, $Zn^{++}$, $Ba^{++}$, $Co^{++}$, $Fe^{++}$, $Fe^{+++}$, and $NH_4^+$.

The salts of citric acid include but are not limited to, the alkali and alkaline earth metals examples of which as their cations are, $Na^+$, $K^+$, $Mg^+$, $Li^+$, and $Ca^{++}$, $Zn^{++}$, $Ba^{++}$, $Co^{++}$, $Fe^{++}$, $Fe^{+++}$, and $NH_4^+$.

DETAILED DESCRIPTION OF THE EMBODIMENTS

The uses of polyamino acids and their derivatives are well known in the prevention of the deposition of metal scale salts, thus providing excellent properties for prevention of such scale in evaporation or use of hard water, treatments for boiler water, cooling water, oil well waters, agricultural sprays and irrigation water. Further, this property makes them useful as builders in detergents, where deposition of metal salts are injurious to clothing and impart a hard crust to the textile fibers. Their use to prevent deposition of scale on glassware makes them desirable in detergents for automatic dishwashers and the like. Citrates are also well known to have similar properties and Wisk™, (a product of Lever Brothers, New York, N.Y.), cites sodium citrate as the water softening agent on its label. Both polyamino acids and citrates have been used in water treatments and laundry detergents. It is well known that such materials can be used together, however, we have found that mixtures of citric acid and polyamino acids, in their acid or salt forms, or certain derivatives of polyamino acids do not chelate calcium as would be expected but that certain ratios of these materials are synergistic, thus providing benefits far beyond expectation in the chelation of calcium and thus the inhibition of calcium scale deposits or water softening.

We have discovered a synergistic composition for sequestration of calcium ions comprised of (a) citric acid or its salts and (b) a polyamino acid having a charge density of $COO^-$ approximately equal to $10^{-3}$ mole/g of polymer in a ratio of from 75 to 25 of polymer to citrate to 0.1 to 99.9 of polymer to citrate.

A preferred ratio of polymer or its salts to citric acid or its salts is between 1 to 1 and 1 to 99 which provides an enhanced chelation of $Ca^{++}$.

EXAMPLE 1

Oxalate Titration for Calcium Sequestration

This procedure is well known in the art to demonstrate Ca ion sequestration. The sample, 0.25 g, was placed in 100 ml of deionized water and 1.0 ml of 3% sodium oxalate solution was added (in deionized water). The pH was adjusted to 9.0–9.2 with 10% NaOH or 10% HCl. The solution was titrated to the appearance of turbidity with 0.1M $CaCl_2$ solution (in deionized water). The results of the assay using the ratios of polyamino acids or derivatives thereof to citrate indicated are given in Table 1. Additive 1 is the salt of polyaspartic acid or one of its copolymers, while Additive II is one of the salts of citrate or other commonly used detergent additives. The higher the amount of $CaCl_2$ consumed, the better the Ca sequestering ability of the additives.

TABLE 1

| Additive I (mg) | 250 / 0 | 200 / 50 | 125 / 125 | 50 / 200 | 25 / 225 | 12.5 / 237.5 | 0 / 250 | Additive II (mg) |
|---|---|---|---|---|---|---|---|---|
| | | | $CaCl_2$ Titrant Used (ml) | | | | | |
| polyaspartic acid[a] | 7.5 | | 9.35 | 9.55 | 10.45 | 9.75 | 8.35 | sodium citrate |
| polyaspartic acid[a] | 7.5 | 7.15 | 6.2 | 7.3 | | | 8.0 | sodium tripolyphosphate |
| polyaspartic acid[a] | 7.5 | 7.65 | 7.8 | 6.75 | | | 6.25 | sodium nitrilotriacetate |
| DETA[b,c]/ polyaspartic acid copolymer | 7.15 | 7.75 | 9.2 | 9.6 | 10.6 | 9.15 | 8.35 | sodium citrate |
| DETA/polyaspartic acid copolymer | 7.15 | 7.0 | 7.15 | 6.95 | | | 8.35 | sodium EDTA[c] |
| polyaspartic acid[d] | 7.95 | 8.2 | 8.8 | 10.2 | | | 8.35 | sodium citrate |
| polyglutamic acid | 6.35 | 7.2 | 8.2 | 8.9 | 9.0 | | 8.35 | sodium citrate |
| polyglutamic acid | 6.35 | 6.9 | 6.5 | 7.3 | | | 8.0 | sodium tripolyphosphate |
| polyglutamic acid | 6.35 | | 6.3 | | | | 6.25 | sodium nitrilotriacetate |
| polyacrylate, 2000 mw | 10.1 | | 8.8 | | | | 8.0 | sodium tripolyphosphate |
| polyacrylate, 4500 mw | 12.3 | | 13.35 | 14.3 | | | 8.35 | sodium citrate |
| polyacrylate, 2000 mw | 10.1 | | 10.95 | | | | 8.35 | sodium citrate |

[a]prepared by method of U.S. Pat. application Ser. No. 08/007,376 now U.S. Pat. No. 5,288,783 in which the salt is prepared by reacting maleic acid with ammonia in a ratio of 1:1, at a temperature of 190, for four hours or less and hydrolyzed with a metal hydroxide or ammonium hydroxide.
[b]prepared by method of U.S. Pat. application Ser. No. 07/926,242 now abandoned in which the salt is prepare by reacting (1) maleic acid, (2) ammonia and (3) a polyamine at a temperature above 120° C.
[c]DETA stands for diethylene triamine; EDTA stands for ethylenediamine tetraacetic acid
[d]prepared by thermal polymerization of L-aspartic acid at 240° C.

EXAMPLE 2

Synergism of Citrate and the Lysine Copolymer of Polyaspartic Acid

The assay of Example 1 was used to evaluate a lysine copolymer of polyaspartic acid prepared by the method of U.S. patent application Ser. No.07/926,242, filed Aug. 6, 1992 now abandoned, by Louis L. Wood, incorporated herein by reference, and compared with the polyaspartic made by the method of U.S. patent application Ser. No. 08/007,376, filed Jan. 21, 1993 now U.S. Pat. No. 5,288,783, by Louis L. Wood, incorporated herein by reference, in duplicate runs and the results are given in Table 2. Additive I is the salt of polyaspartic acid or one of its copolymers.

TABLE 2

| Additive I (%) | 100 | 95 | 75 | 50 | 25 | 10 | 5 | 1 | 0.1 | 0 |
| --- | --- | --- | --- | --- | --- | --- | --- | --- | --- | --- |
| sodium citrate (%) | 0 | 5 | 25 | 50 | 75 | 90 | 95 | 99 | 99.9 | 100 |
| | | | | CaCl$_2$ Titrant Used (ml) | | | | | | |
| Additive I | | | | | | | | | | |
| polyaspartic acid[a] | 7.4 | 7.3 | 8.6 | 8.7 | 11.0 | 11.2 | 10.7 | 9.8 | 8.6 | 8.8 |
| polyaspartic acid[a] | 7.4 | 7.7 | 8.7 | 8.5 | 10.9 | 11.7 | 10.9 | 10.2 | 9.3 | 9.2 |
| lysine copolymer of polyaspartic acid[b] | 8.4 | | 9.5 | 10.1 | 11.2 | 11.5 | — | 10.8 | 8.5 | 8.8 |
| lysine copolymer of polyaspartic acid[b] | 8.6 | | 9.3 | 9.8 | 11.0 | 11.5 | — | 9.9 | 9.2 | 9.2 |

[a] prepared by method U.S. Pat. application Ser. No. 08/007,376 now U.S. Pat. No. 5,288,783 as detailed in Example 1.
[b] prepared by method U.S. Pat. application Ser. No. 07/926,242 now abandoned as detailed in Example 1.

It will be apparent to those skilled in the art that the examples and embodiments described herein are by way of illustration and not of limitation, and that other examples may be utilized without departing from the spirit and scope of the present invention, as set forth in the appended claims.

We claim:

1. A detergent composition comprising citric acid or a salt of citric acid and a polymer, said polymer being selected from the group consisting of polyamino acids and polyamine copolymers of polyamino acids, in a ratio of from 75 to 25 of polymer to citric acid or a salt of citric acid to 0.1 to 99.9 of polymer to citric acid or a salt of citric acid.

2. The composition of claim 1 wherein the ratio of polymer to citric acid or a salt of citric acid is from 1 to 1 to 1 to 99.

3. The composition of claim 1 in which the polymer is polyaspartic acid.

4. The composition of claim 1 in which the polymer is polyglutamic acid.

5. The composition of claim 1 in which the polymer is composed of one or more amino acids.

6. The composition of claim 1 in which the polymer is prepared by reacting maleic acid, ammonia, and a polyamine.

7. The composition of claim 1 in which the polymer is prepared by reacting maleic acid and ammonia.

8. The composition of claim 1 in which the polymer is prepared by reacting maleic acid, ammonia, and an amino acid.

9. The composition of claim 6 in which the polyamine is diethylene triamine.

10. The composition of claim 8 in which the amino acid is lysine.

11. The composition of claim 1, wherein the ratio of polymer to citric acid or a salt of citric acid is from 25 to 75 to 0.1 to 99.9.

12. The composition of claim 11, wherein the polymer is polyaspartic acid.

13. The composition of claim 1, wherein the ratio of polymer to citric acid or a salt of citric acid is from 10 to 90 to 0.1 to 99.9.

14. The composition of claim 13, wherein the polymer is polyaspartic acid.

15. The composition of claim 1, wherein the ratio of polymer to citric acid or a salt of citric acid is from 25 to 75 to 5 to 95.

16. The composition of claim 15, wherein the polymer is polyaspartic acid.

17. The composition of claim 1, wherein the ratio of polymer to citric acid or a salt of citric acid is from 25 to 75 to 10 to 90.

18. The composition of claim 17, wherein the polymer is polyaspartic acid.

19. The composition of claim 17, wherein the polymer is a lysine copolymer of polyaspartic acid.

20. A detergent composition comprising citric acid or a salt of citric acid and a polymer, said polymer being selected from the group consisting of polyamino acids and polyamine copolymers of polyamino acids, wherein the ratio of said polymer to said citric acid or a salt of citric acid is from 25 to 75 to 1 to 99.

21. A method of using the detergent composition of claim 1, wherein the detergent composition is added to water to inhibit or reduce calcium scale formation.

22. A method of using the detergent composition of claim 1, wherein the detergent composition is added to water to inhibit or reduce the deposition of calcium salts on clothing during laundering.

23. A method of using the detergent composition of claim 11, wherein the detergent composition is added to water to inhibit or reduce calcium scale formation.

24. A method of using the detergent composition of claim 11, wherein the detergent composition is added to water to inhibit or reduce the deposition of calcium salts on clothing during laundering.

25. A method of using the detergent composition of claim 13, wherein the detergent composition is added to water to inhibit or reduce calcium scale formation.

26. A method of using the detergent composition of claim 13, wherein the detergent composition is added to water to inhibit or reduce the deposition of calcium salts on clothing during laundering.

* * * * *